W. J. SLUKA.
MACHINE FOR TRANSFORMING BOILED SUGAR INTO A CREAMY PASTE.
APPLICATION FILED JUNE 30, 1910.
976,511. Patented Nov. 22, 1910.
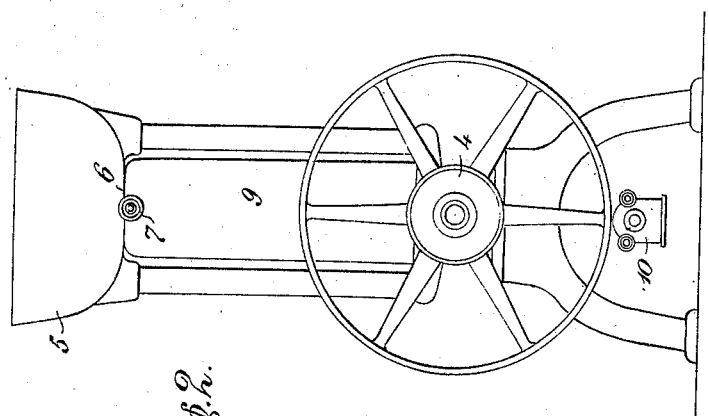
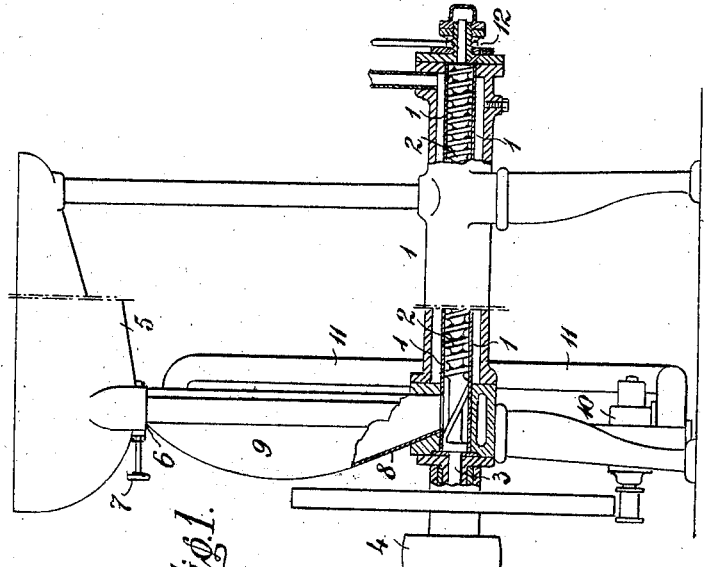
Witnesses
Inventor
Wilhelm Josef Sluka
by Harold Serrell
his atty.

UNITED STATES PATENT OFFICE.

WILHELM JOSEF SLUKA, OF VIENNA, AUSTRIA-HUNGARY.

MACHINE FOR TRANSFORMING BOILED SUGAR INTO A CREAMY PASTE.

976,511. Specification of Letters Patent. Patented Nov. 22, 1910.

Application filed June 30, 1910. Serial No. 569,684.

*To all whom it may concern:*

Be it known that I, WILHELM JOSEF SLUKA, a subject of the Emperor of Austria-Hungary, residing at Vienna, Empire of Austria-Hungary, have invented certain new and useful Improvements in Machines for Transforming Boiled Sugar into a Creamy Paste; and I do hereby declare the following to be a full, clear, and exact description of the invention, such as will enable others skilled in the art to which it appertains to make and use the same.

To give boiled sugar the creamy nature or aggregate state in which it is suitable for use as cake icings or the like, or for filling certain sorts of bonbons, the boiled sugar paste had hitherto to be poured on to a cooled plate and worked thereon by means of spatulas until the desired consistency or aggregate state was obtained.

The object of the present invention is a machine by means of which the cooling and working of the sugar paste is effected completely automatically.

Figures 1 and 2 of the accompanying drawing show a type of machine constructed according to the invention in side elevation partially in section and in end view respectively.

A horizontal tubular casing 1 is arranged in the frame of the machine. In this casing 1, which is double-walled and cooled by water circulating between the two walls a rotating worm 2 is arranged, which is driven by a pulley 4 on the worm spindle 3. Above the casing 1 a basin 5 is arranged in the machine frame, which serves to hold the boiled sugar. At the deepest part of the basin 5 a discharge socket 6 is provided for the sugar, which discharge may be controlled by a stop valve tap, or slide 7. At the side of the discharge orifice in the basin 5 a shell like bent plate 9 is provided which passes downward into an inlet flange 8 on the casing 1. Further a fan 10, bellows, or the like is provided in the lower part of the frame, which forces a current of air through a vertical pipe 11, the mouth of which is directly below, and at the side of the discharge orifice of the basin 5 and opposite the shell like plate 9.

The jet of sugar flowing out of the discharge socket 6 is thrown against the plate 9 by the current of air issuing from the pipe 11 and is thus cooled and further cooled while flowing down the plate 9. From the latter, the sugar flows by the flange 8 into the casing 1 and is worked therein by the rotating worm 2 and simultaneously conducted toward the discharge side of the casing 1. The sugar is constantly cooled while it is being worked by the water circulating between the walls of the casing 1. The sugar paste in the desired creamy state is finally discharged from the machine through the hole 12.

Claims:

1. In a machine for transforming boiled sugar into a creamy paste, the combination of a basin for the boiled sugar, a casing, means for kneading the sugar inclosed by such casing, a discharge opening in such basin, whereby the sugar is caused to flow from the basin into the said casing, and means for blowing air against the sugar flowing from the basin into the casing, substantially as and for the purpose described.

2. In a machine for transforming boiled sugar into a creamy paste, the combination of a basin for the boiled sugar, a casing, means for kneading the sugar inclosed by such casing, a discharge opening in such basin, whereby the sugar is caused to flow from the basin into the said casing, a plate connecting the basin and the casing and means for blowing air against the sugar flowing from the basin into the casing whereby the sugar is thrown against the said plate, substantially as and for the purpose described.

3. In a machine for transforming boiled sugar into a creamy paste, the combination of a basin for the boiled sugar, a casing, a discharge opening in such basin whereby the sugar is caused to flow from the basin into the said casing, a worm contained in such casing whereby the sugar entering the casing is kneaded and means for blowing air against the sugar flowing from the basin into the casing, substantially as and for the purpose described.

In testimony whereof, I affix my signature, in presence of two witnesses.

WILHELM JOSEF SLUKA.

Witnesses:
ARTHUR GAMMANN,
AUGUST FUGGER.